G. WENZELMANN.
SCALE TESTER.
APPLICATION FILED SEPT. 9, 1912.
1,118,981.
Patented Dec. 1, 1914.
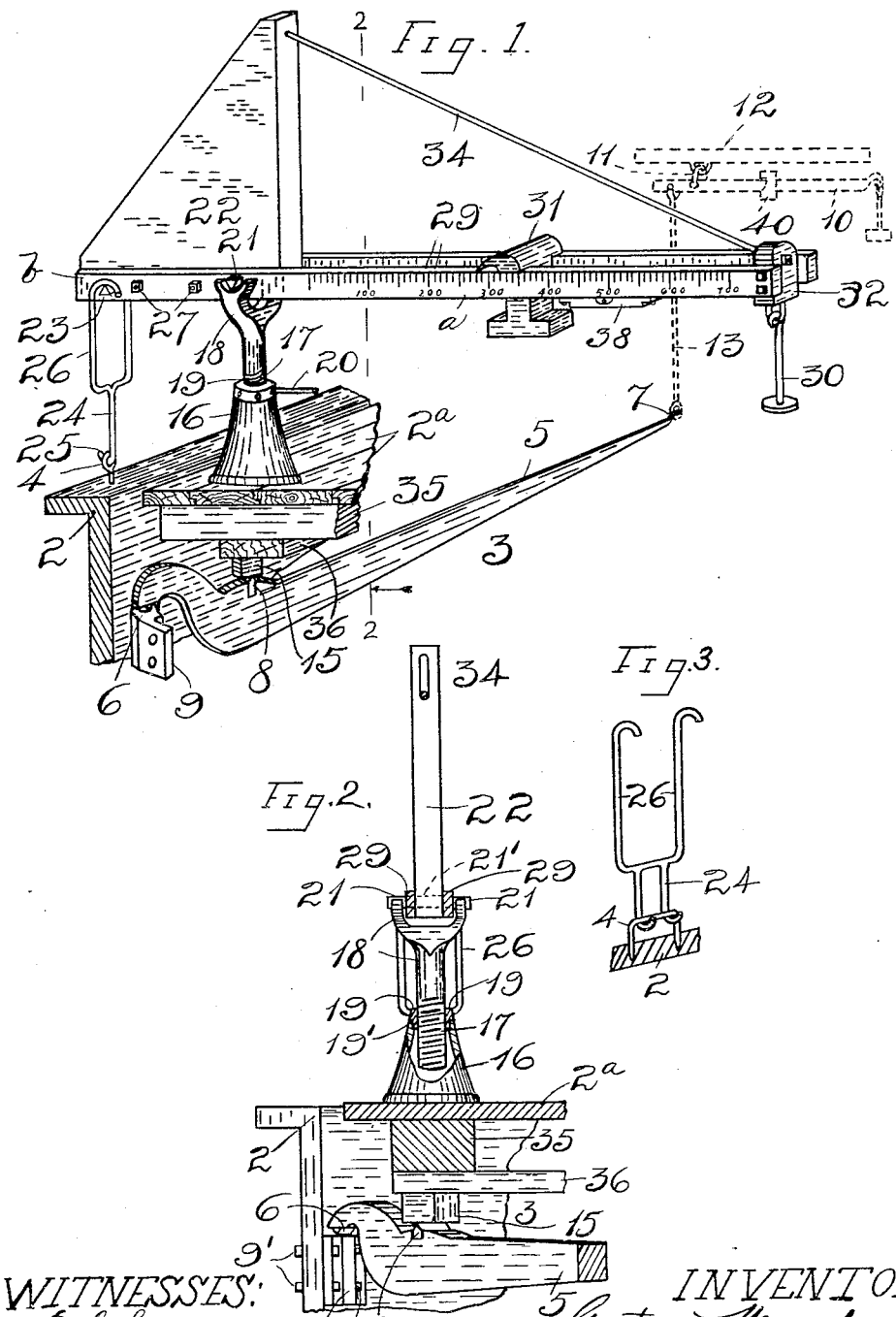

UNITED STATES PATENT OFFICE.

GUSTAVE WENZELMANN, OF GALESBURG, ILLINOIS.

SCALE-TESTER.

1,118,981.  Specification of Letters Patent.  Patented Dec. 1, 1914.

Application filed September 9, 1912. Serial No. 719,450.

*To all whom it may concern:*

Be it known that I, GUSTAVE WENZELMANN, a citizen of the United States, and a resident of Galesburg, in the county of Knox and State of Illinois, have invented a new and useful Scale-Tester, of which the following is a specification.

My present invention relates to devices which are employed for testing the accuracy of platform weighing-scales. The usual means employed in accomplishing this is a plurality of standard and pre-tested weights, and the method is to place them first singly and then progressively increasing in number to determine the accuracy of the scales in weighing light and heavy loads. Large scales necessitate not only heavy weights but also a large number of them, and as they weigh, as a rule, fifty pounds each, and forty of them are required to test the scales to a ton weight, it is a heavy task and an expensive one to purchase, transport and handle them. Moreover, the operation is a burdensome one, inasmuch as the weights are (one by one) successively placed at each corner of the platform. The operator thus handles them in taking them from the store house to the wagon in which they are hauled, in placing them in their first positions on the scale platform, in moving them off therefrom, in replacing them, one by one on the three other corners, from two of which they must be first removed, in placing them again on the wagon, and finally in unloading them at the storeroom. The vast amount of work necessitated by these operations has caused lax treatment of many scales, which are thus permitted to become imperfect and unreliable. Again, a quantity of mud and other dirt frequently adheres to the test weights, rendering them inaccurate and unreliable.

To provide simple and inexpensive means, readily and easily transportable and as readily and easily placed and displaced or removed, which will infallibly determine the accuracy of (or test) a platform scale, constitutes the primary object of my invention. In carrying out this object it will be necessary for the operator to handle only about one-twentieth part of the weight heretofore handled, but he will nevertheless achieve the ultimate result in much less time and in a superior manner.

A further object is to provide means for balancing the tester and, in connection with this object, to determine when the tester *per se* is in equilibrium.

That the mechanism constituting the means above recited be durable, simple, and inclusive of co-acting parts some of which shall relieve others from strain, displacement or distortion, is a factor, and to provide a construction of this character is another object.

Minor objects will be in part obvious and in part pointed out.

For the purpose of illustrating the manner of carrying out the foregoing ends and objects of the invention I have shown in the accompanying drawings that embodiment thereof which is at present preferred by me; however, it is to be understood that the various instrumentalities in which my invention consists may be altered, variously arranged, and otherwise organized, and that I do not contemplate the scope thereof as limited to the structure shown and described, but consider it as covering all such changes as fairly fall within the general idea of its amplitude, considered in its broadest aspect.

The invention accordingly consists in mechanical means for testing the accuracy of weighing-scales, not only in the specific form shown and described (as I am aware that numerous changes may be readily made) but in modifications thereof which are adapted to effect a like or a similar purpose; in features of construction; in combinations of elements; and in the arrangement and disposition of the parts for co-action, the scope of all of which will be pointed out in the appended claims.

In the drawing above referred to, mechanism embodying the preferred structural features, arrangement, connection, and mutual relationship of the several parts of my improvements and the adjacent parts of a platform scale to which the improvements are attached, is shown.

In said drawings: Figure 1 is a perspective, partly broken away; Fig. 2, a transverse vertical section view, taken in the plane of the line 2—2 in Fig. 1; and Fig. 3, a detail, a modification, seen in perspective.

Coming now to a detailed description of the drawings, in which the several elements and their factors are, wherever employed, each uniformly designated by a distinguishing reference character, 2 indicates a fragment of the frame in which the scale-platform 2ª is arranged.

3 is the pit.

4 designates an eye, for a purpose presently described, suitably secured to the frame or other stationary object.

5 is a scale-lever. Of these there are preferably four—one at each corner of the platform and running diagonally toward its center. Each lever 5 is shown as provided at its inner end with an end-bearing 6, at its outer end with a hook-bearing 7, and intermediate its ends with a fulcrum-bearing 8. I have shown as a means for supporting the inner end of the lever 5 a bearing-bracket 9, which is illustrated as fixed by bolts 9' to a corner of the frame 2.

10 is a scale-beam, fulcrumed on a link 11 swung from the scale-frame top 12.

13 is a rod connecting the lever 5 and beam 10.

2ª is a platform, sustaining at each corner a bearing foot 15 which may be connected thereto or therewith in any suitable manner.

The construction of the foregoing recited structure is that of a well known type of scales, and inasmuch as their specific construction bears no particular relationship to my invention, except only insofar as they coöperate, they need not be further herein described.

16 designates a hollow jack-screw base, adapted for the reception of the threaded stem 17 of a bifurcated bearing-foot 18, which latter is actuable in either vertical direction, for a purpose presently described, by an internally threaded spanner 19 having an annular shoulder 19' rotatably mounted on the ring-like top of said base, and which spanner may be operated by a lever 20.

21 designates oppositely disposed knife-edge bearings fixed in the lower portion of a casting or frame 22.

23, 23 are oppositely directed bearings, likewise fixed. Hung from the bearings 23 is a connector 24 having at its upper end a hooked yoke 26 which constitutes a bearing for said knife-edges 23, and its lower end is fashioned into a hook 25 for engagement with the eye 4, Fig. 1, or with the similarly designated staple shown in Fig. 3.

27, 27 indicate frame bolts.

A graduated, and as shown, double scale-test beam 29 is secured by the bolts 27 to and along the lower edge of the frame 22, (which may be a skeleton, if preferred,) and the knife edges 21 project through apertures in the beam elements and seat in the bearings in the fork 18. It will of course be manifest that a single beam may be substituted for the double one shown; that the casting 22 may be otherwise constructed; and that the bearings 21 may be elsewhere secured than where shown. Slidably mounted on and between said beams is a poise 31. Secured to the free ends of the beams is a block 32 from which swings a counterweight 30 on which may be placed loose weights (not shown) in the ordinary manner. A rod 34 engages the block 32 with an eye in the frame 22 to sustain the beam ends.

The device shown in the modification (Fig. 3) comprises substantially the yoke 26 of the principal figure, the connection thereof in duplicate, and a staple which is manifestly the equivalent of the eye 4 but which may be secured either as shown or may have one of its limbs secured to the end and the other to the side pieces and thereby diagonally of the frame 2.

35, 36 designate sills above and on which the scale-platform is supported.

To test the accuracy of the scales the operator places in suitable position the parts shown as disposed above the platform, and then engages the hook 25 with the eye 4 or with any other suitable stationary object. By adjustment of the poise 31 to a predetermined point the beam 29 will, because of the power arms $a$ being much longer than are the weight arms $b$, multiply the weight in the fashion of devices of this character. No attempt has been made in the drawing to accurately measure the graduations on the scale-beam. The rule that, the multiplication of a lever is the number of times the distance between the fulcrum and the short end of the lever is contained in the distance between the fulcrum and the long end of the lever, is, in practice, followed out. The multiplied weight on the beam will be imparted through the elements 21, 18, 17, 19, 16, 2ª, 35, 36 and 15 respectively, to the knife edge 8 which, being integral with the scale lever 5 will, through the instrumentality of the connecting rod 13, act on the scale-beam 10 in an evident manner. The poise 31 on the tester-beam will correspond with or indicate the same as does the poise 40 on the scale-beam when the scales are accurate. This may be more fully explained as follows: It being first shown (as presently described) that the tester is accurate, and it being set to indicate a weight of say 1000 pounds (either by adjustments of the poise 31 or by the loose weights, or by both) the poise 40 upon being set to the recited weight will indicate infallibly the exact weight placed upon the platform. The exact weight of the tester being already known, it is to be deducted from the total.

In order that the tester-beam may be maintained in horizontal position and therefore in equilibrium, or true, I have provided the jack-screw 17 for raising and lowering the fulcrum of the lever or beam 29 for a manifest purpose—its rear end being secured. And in order to determine when said beam has reached the said position I have provided an ordinary spirit-level 38, which may be secured thereto in any suitable and preferred manner and position. Its manner of operation will be evident.

Having thus set forth the nature of my invention, and having shown and described preferred means for carrying it into effect, I claim as new:—

1. The combination with a scale including a platform and a scale-beam, of a jack-screw adapted to bear upon said platform and thereby act on said beam, means co-acting with said jack-screw for increasing the pressure on said platform and for indicating the amount thereof, a removable yoke connected at one end to the last recited element and its other end to a fixed object, and a level secured on said pressure-indicating means whereby its equilibrium may be determined.

2. The combination with a scale framework and platform, of a scale-tester beam, a bracket secured to its inner end portion, a rod connecting said bracket with the outer end of said beam, a jack-screw on which the beam is fulcrumed, said jack-screw adapted for selective placements on said platform, a removable yoke connecting the inner end of said beam with said framework, and weight-determining means adapted for selective engagements with said beam.

3. In combination with a scale-platform and framework a scale-tester beam, a bracket secured to its inner portion, a rod connecting said bracket with the outer end of said beam, a jack-screw on which the beam is fulcrumed, adapted for selective placements on said platform, a removable yoke connecting the inner end of said scale-beam with said framework, weight determining means adapted for selective engagements with said beam, a scale-lever on which said platform bears, and a level for indicating when said scale-tester beam is in equilibrium.

In testimony whereof I hereunto affix my signature this 5th day of September, 1912, in presence of two subscribing witnesses.

GUSTAVE WENZELMANN.

Witnesses:
L. F. WERTMAN,
F. L. CONGER.

Copies of this patent may be obtained for five cents each, by addressing the "Commissioner of Patents, Washington, D. C."